US005631629A

United States Patent [19]

Fooks et al.

[11] Patent Number: 5,631,629

[45] Date of Patent: May 20, 1997

[54] HEARTBEAT COMMUNICATIONS

[75] Inventors: Elik I. Fooks, Lexington; Patrick J. Delaney, III, Sudbury; Philip E. Johnson, Worcester, all of Mass.

[73] Assignee: Allen-Bradley Company, Inc., Milwaukee, Wis.

[21] Appl. No.: 385,413

[22] Filed: Feb. 8, 1995

[51] Int. Cl.[6] .............................. G08B 23/00; G06F 15/00

[52] U.S. Cl. ........................... 340/500; 340/507; 340/511; 340/539; 340/870.07

[58] Field of Search ..................................... 340/500, 506, 340/507, 510, 518, 539, 538, 531, 825.06, 825.16, 825.03, 870.18, 870.16, 870.09, 853.2, 870.01, 870.07; 364/138–141, 146, 413.02, 413.04, 413.03, 413.06; 359/110, 143, 164, 167; 128/630

[56] References Cited

U.S. PATENT DOCUMENTS

| | | | |
|---|---|---|---|
| 3,573,776 | 4/1971 | Dick et al. | 340/511 |
| 4,101,872 | 7/1978 | Pappas | 340/539 |
| 4,385,287 | 5/1983 | Eatwell | 340/505 |
| 4,394,655 | 7/1983 | Wynne et al. | 340/505 |
| 4,470,047 | 9/1984 | Vogt et al. | 340/511 |
| 4,507,652 | 3/1985 | Vogt et al. | 340/505 |
| 4,658,249 | 4/1987 | Vogt | 340/825.08 |
| 4,785,285 | 11/1988 | Teich et al. | 340/518 |
| 4,850,018 | 7/1989 | Vogt | 340/505 |
| 4,853,685 | 8/1989 | Vogt | 340/512 |
| 4,899,131 | 2/1990 | Wilk et al. | 340/518 |
| 4,916,432 | 4/1990 | Tice et al. | 340/518 |
| 4,952,926 | 8/1990 | Vogt | 340/502 |

*Primary Examiner*—Donnie L. Crosland

*Attorney, Agent, or Firm*—John J. Bruckner; John M. Miller; John J. Horn

[57] ABSTRACT

A dual channel communications method including: (A) providing a control system with a central control station and a remote sensor for sensing a process status, the central control station and the remote sensor being connected by a power supply line and an output line; (B) impressing a non-periodic high-amplitude process status signal on the output line at the remote sensor so as to transfer status information about the process status to the central control station; (C) simultaneously impressing a periodic low-amplitude low-frequency diagnostic condition signal on the output line at the remote sensor so as to transfer diagnostic information about an operating condition of the remote sensor to the central control station; (D) monitoring the electrical state of the output line at the central control station to detect the level of the non-periodic high-amplitude process status signal so as to receive status information about the process status at the central control station; and (E) monitoring the electrical state of the output line at the central control station to detect the presence of the periodic low-amplitude low-frequency diagnostic condition signal so as to receive diagnostic information about the operating condition of i) the remote sensor, ii) said power supply line and iii) said output line at the central control station.

10 Claims, 7 Drawing Sheets

HEARTBEAT COMMUNICATIONS

BACKGROUND OF THE INVENTION

1. Field of Use

The present invention relates generally to the field of communication systems. More particularly, the present invention concerns control systems that have remote sensors that transfer status information about a process condition and diagnostic information about the sensors themselves. Specifically, a preferred embodiment of the present invention is directed to control systems that have remote sensors that transfer diagnostic information about the remote sensors themselves to a central control station through modulation of a process status signal. The present invention thus relates to a communication system of the type that can be termed diagnostic signaling.

2. Description of Related Art

Heretofore, it was known in the prior art to provide, as part of a control system, remote sensors that communicate their "on/off" state through a pair of wires in which a current exists. Referring to FIG. 1A, this type of remote sensor permits a relatively large current flow to represent a first of the two "on/off" states and a relatively small current to represent the second of the two "on/off" states.

A previously recognized problem has been that a remote sensor can malfunction. When such a malfunction occurs, the current flow from the remote sensor may go to zero and no longer accurately communicate the "on/off" state of the remote sensor. However, the control system to which the remote sensor is connected may misinterpret zero current from the remote sensor to be a normal indication of the relatively small current that represents the second of the two "on/off" states. Alternately, a failure may connect the supply voltage to the sensor output and this would be indistinguishable from the "on" state. What is needed therefore is a method of transmitting encoded diagnostic information from a remote sensor to a central control station. Heretofore, this requirement has not been fully met without incurring various disadvantages.

One unsatisfactory previously recognized solution to the problem of transmitting diagnostic information from a remote sensor was to separately cable the diagnostic information from the remote sensor to a receiving computer or logic controller located in the central control station. Although remote sensors cabled in this way are capable of diagnostically monitoring their own operation by a variety of specific structures and communicating the diagnostic information to the central control station, a disadvantage of this previously recognized solution is that the high cost of separately cabling the diagnostic information from the remote sensor to the receiving computer or logic controller frequently prohibits the economical use of such diagnostic information. Further, this previously recognized solution also has the disadvantage of inherently increasing the susceptibility of the system to malfunctions due to the necessary increase in the mount of wiring.

SUMMARY OF THE INVENTION

The present invention provides a method and apparatus for transmitting diagnostic information from a remote sensor, such as, for example, a photoelectric sensor, a limit switch or an inductive proximity switch to a central control station without requiring additional wiring. Thus, the present invention permits the use of diagnostic information from remote sensors without increasing the amount or cost of wiring for a control system, by multiplexing diagnostic data from the remote sensor to a central control station on a preexisting sensor output line. Significantly, the diagnostic information from the remote sensor is provided in a format that permits the normal operation of a remote sensor according to the present invention with receiving subsystems of conventional control systems that are not equipped to decode, or otherwise process, the diagnostic information from the remote sensor. Similarly, central control stations according to the present invention can be used with conventional remote sensors that do not multiplex diagnostic data on a preexisting output line.

It is therefore an object of the present invention to provide a dual channel communications method comprising: (A) providing a control system with a central control station and a remote sensor for sensing a process status, said central control station and said remote sensor being connected by a power supply line and an output line; (B) impressing a non-periodic high-amplitude process status signal on said output line at said remote sensor so as to transfer status information about said process status to said central control station; (C) simultaneously impressing a periodic low-amplitude low-frequency diagnostic condition signal on said output line at said remote sensor so as to transfer diagnostic information about an operating condition of said remote sensor to said central control station; (D) monitoring the electrical state of said output line at said central control station to detect the level of said non-periodic high-amplitude process status signal so as to receive status information about said process status at said central control station; and (E) monitoring the electrical state of said output line at said central control station to detect the presence of said periodic low-amplitude low-frequency diagnostic condition signal so as to receive diagnostic information about said operating condition of i) said remote sensor, ii) said power supply line and iii) said output line at said central control station.

In accordance with this aspect of the present invention, a dual channel communications capable control system is provided comprising: (A) a remote sensor for sensing a process status and an operating condition of said remote sensor, said remote sensor including i) a switch for switching an output signal from said remote sensor between a first status band and a second status band as a function of said process status in response to information about said process status sensed by said remote sensor so as to transmit status information about said process status and ii) a modulator for (a) continuously toggling said output signal within a first diagnostic range, when said output signal is within said first status band, as a function of said operating condition of said remote sensor in response to diagnostic information about said operating condition of said remote sensor so as to transmit diagnostic information about said operating condition of said remote sensor, and (b) continuously toggling said output signal within a second diagnostic range, when said output signal is within said second status band, as a function of said operating condition of said remote sensor in response to diagnostic information about said operating condition of said remote sensor so as to transmit diagnostic information about said operating condition of said remote sensor; (B) an output line including a first end and a second end, said first end of said output line being electrically connected to said remote sensor so as to conduct said output signal; and (C) a central control station for centrally monitoring status information about said process status and diagnostic information about said operating condition of said remote sensor through said output line based on an electrical state of said output signal, said central control station being electrically connected to said second end of said output line, said central control station including i) a detector for detecting switching of said output signal between said first status band and said second status band so as to respond to changes in said output signal characterized by status information about said process status received through said output line and ii) a detector for detecting continuous toggling of said output signal within said first diagnostic range and said second diagnostic range so as to respond to changes in said output signal characterized by diagnostic information about said operating condition of said remote sensor received from said remote sensor through said output line, wherein status information about said process status and diagnostic information about said operating condition of said remote sensor can be simultaneously carried by said output signal over said output line.

Other aspects and objects of the present invention will be better appreciated and understood when considered in conjunction with the following description and drawing sheets.

BRIEF DESCRIPTION OF THE DRAWINGS

The advantages and features of the present invention will become more readily apparent with reference to the detailed description which follows and to exemplary, and therefore non-limiting, embodiments illustrated in the following drawings in which like reference numerals refer to like elements and in which.

DESCRIPTION OF PREFERRED EMBODIMENTS

The present invention and various aspects, objects, advantages, features and advantageous details thereof are explained more fully below with reference to exemplary, and therefore non-limiting, embodiments described in detail in the following disclosure and with the aid of the drawings. In each of the drawings, parts the same as, similar to, or equivalent to each other, are referenced correspondingly.

1. Resume

All the disclosed embodiments can be realized using conventional electrical components without undue experimentation. All the disclosed embodiments are useful in conjunction with communication systems such as are used for the purpose of controlling industrial processes, or for the purpose of controlling environmental systems such as heating, ventilation and air conditioning, or the like. There are virtually innumerable uses for the present invention, all of which need not be detailed here.

2. System Overview

The present invention provides a communication system for diagnostic signaling from remote sensors to a central control station through signal modulation, such as, for example, current modulation. The invention can be used with virtually any type of sensor, such as, for example, photoelectric sensors, limit switches, proximity sensors, inductive sensors, and capacitive sensors, or the like.

3. Detailed Description of Preferred Embodiments

Figure 2:
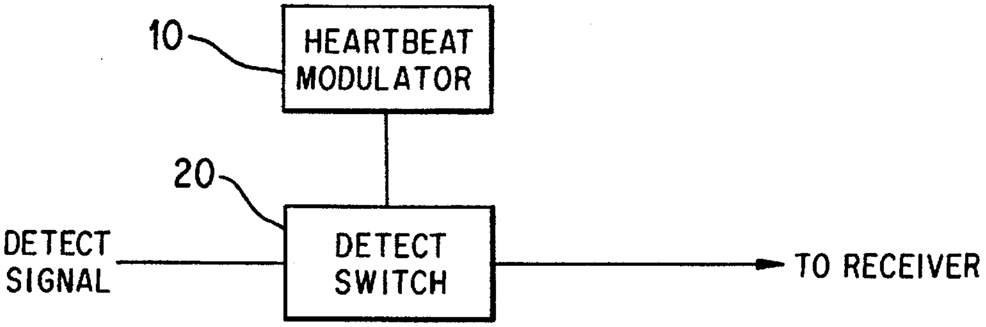
FIG. 2 illustrates a block diagram of a sensor modulator according to the present invention.

Referring now to the block diagram shown in FIG. 2, a sensor modulator of a remote sensor according to the present invention includes a sensor encoder which includes two main parts, namely, a heartbeat modulator 10, connected to a detect switch 20. In normal operation, status information about a process status detected by the remote sensor electrically drives the detect switch 20. A diagnostic oscillator, not shown in FIG. 2, modulates the sensor output slightly to indicate correct remote sensor operation. In a preferred embodiment, the modulation causes a periodic fluctuation in the output current at a nominal low-frequency of, for example, from approximately 10 Hz to approximately 60 Hz, preferably, approximately 35 Hz. Alternatively, the modulation can cause a periodic fluctuation in the output voltage or current at a nominal low-frequency of, for example, from approximately 5 Hz to approximately 300 Hz, preferably, approximately 35 Hz.

Figure 3:
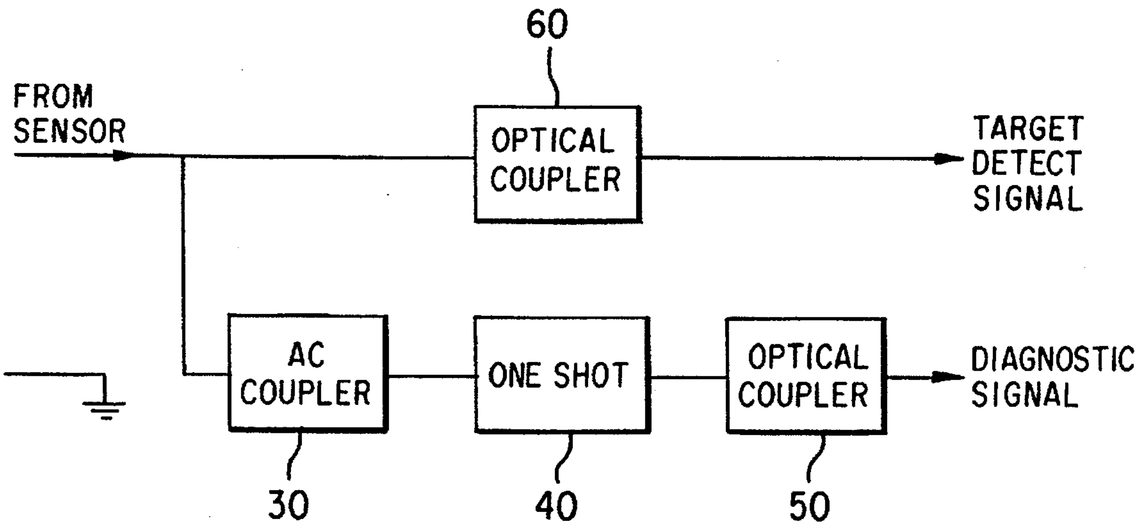
FIG. 3 illustrates a block diagram of a logic controller decoder according to the present invention.

Referring now to the block diagram shown in FIG. 3, the logic controller decoder of a central control station according to the present invention includes an AC coupler 30, connected to a retriggerable one shot 40, that is connected to an optical coupler 50. In operation, the AC coupler 30 strips a diagnostic modulation from a remote sensor signal, in this example a remote photosensor "target detect" signal, amplifies it, and uses it to trigger the one shot 40. As long as the diagnostic modulation is present, the one shot 40, will be periodically retriggered before the one shot 40, times out, thereby causing a steady diagnostic signal to be emitted from optical coupler 50. Simultaneously, a target detect signal is emitted from optical coupler 60. The logic controller decoder is advantageously provided with a disable line. When the logic controller decoder is being used with conventional remote sensors that do not include a heartbeat modulator, (i.e., a diagnostic modulation), the disable line is grounded to eliminate false diagnostic indications.

Figure 1A:
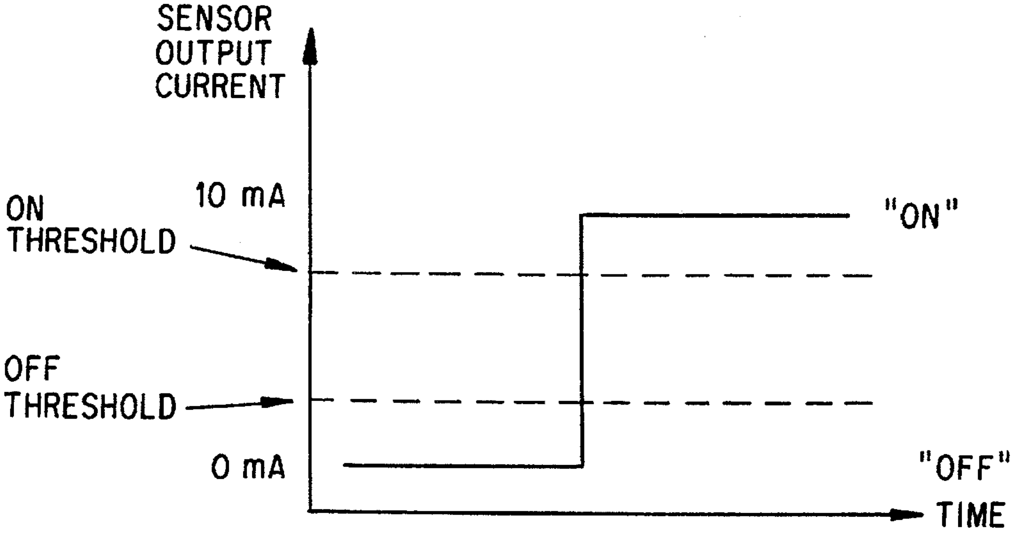
FIG. 1A PRIOR ART
FIG. 1A illustrates a time domain plot view of a conventional sensor output, appropriately labeled "PRIOR ART"
Figure 1B:
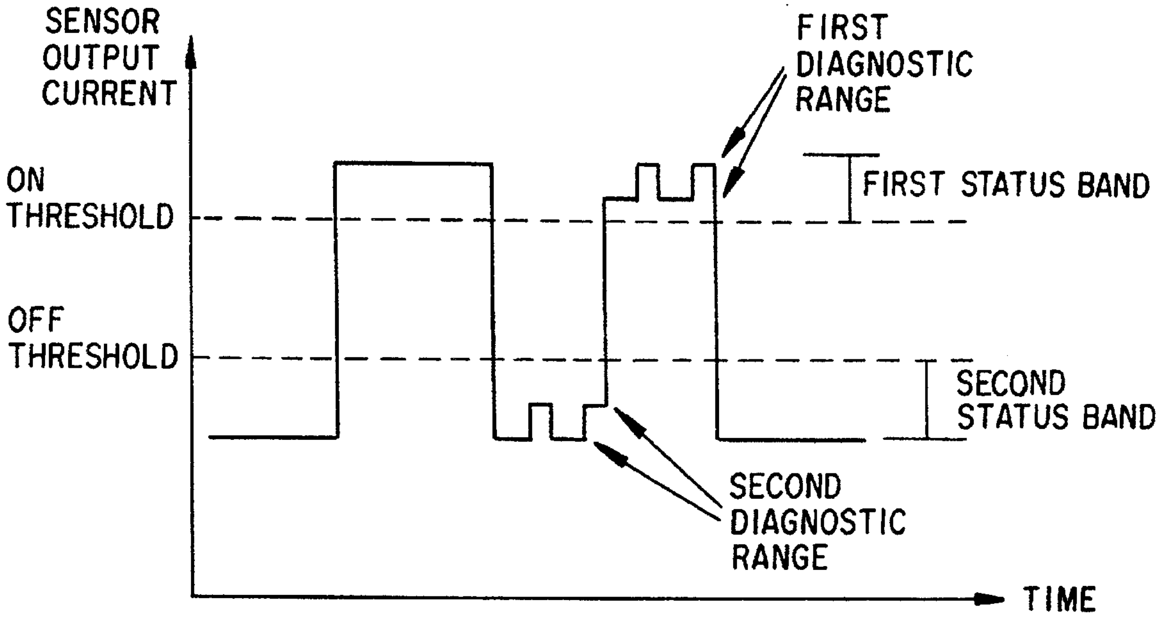
FIG. 1B illustrates a time domain plot view of a sensor output according to the present invention.

Referring now to the time domain plot shown in FIG. 1B, a remote sensor according to the present invention adds a modulation feature to the prior art time domain sensor output shown in FIG. 1A. Specifically, two different current values (both above an "on" threshold) are used represent an "on" state and two different current values (both below an "off" threshold) are used to represent an "off" state. In this way, the sensor on/off states are represented along with diagnostic information. It is to be noted that the modulation can be current modulation or voltage modulation and that one of the two different values used to represent the "off" state can be zero (e.g., 0 mA).

Still referring to FIG. 1B, when an operating condition is detected by the sensor, a signal modulation, in this example a current modulation, is imposed on an output signal, causing it to deviate from non-modulated nominal values. This deviation is small enough that both of the "on" current levels are within a first status band that is higher than the "on" threshold. When the output signal is in the first status band, the modulation of the output signal is within a first diagnostic range. Similarly, both of the "off" current values are within a second status band that is lower than the "off" threshold. When the output signal is in the second status band, the modulation of the output signal is within a second diagnostic range. As a result, the diagnostic modulation does not interfere with normal sensor operation. A central control station including a conventional specialized industrial computer or logic controller, or alternatively, either a remote or block input-output (I/O) system, can detect the diagnostic modulation of the output signal and react to the absence of the diagnostic modulation. Thus, diagnostic information from a remote sensor can be transferred to a central control station without additional wiring.

Figure 4:
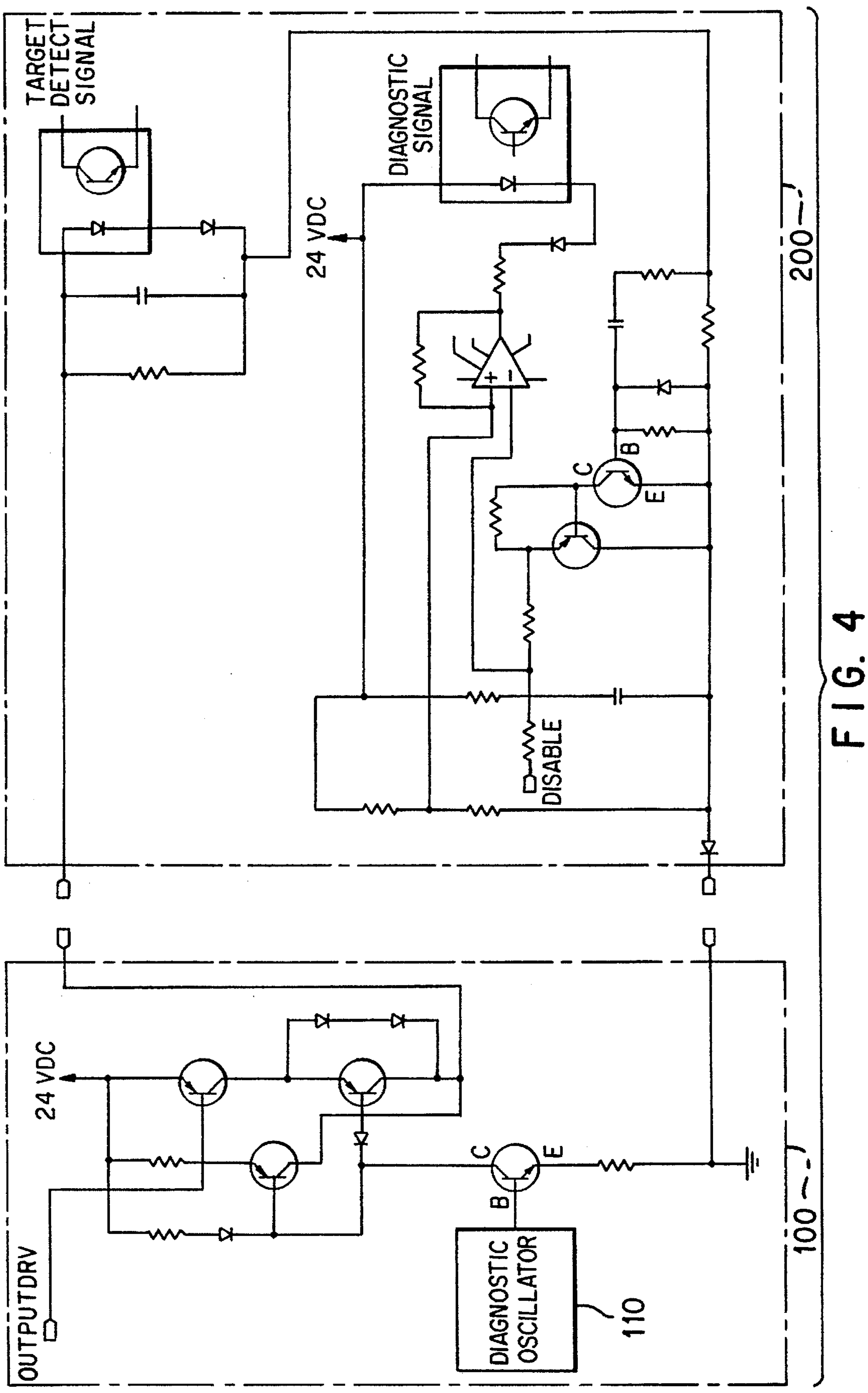
FIG. 4 illustrates a schematic view of a heartbeat diagnostic system according to the present invention.

Referring now to FIG. 4, a schematic diagram for a preferred subgeneric dual channel capable control system according to the present invention is shown. Remote sensor 100, communicates with central control station 200, via connectors that are not shown. Remote sensor 100, includes a standard diagnostic oscillator 110, for continuously toggling an output signal within a first diagnostic range or a second diagnostic range as a function of an operating condition of said remote sensor in response to diagnostic information about said operating condition of said remote sensor so as to transmit diagnostic information about said operating condition of said remote sensor.

Remote sensors according to the present inventions can be either 2 wire or 3 wire versions. Current modulation of the "on" state is more critical with 2 wire versions than with 3 wire versions because there are usually maximum voltage drop limits (I×R) tolerable at the remote sensor circuit. The current through the sensor multiplied by its input impedance constitutes the internal voltage needed to power the remote sensor.

Remote sensors according to the present invention, when used with a central control station according to the present invention, can include capabilities such as sensor electronics verification, sensor wiring verification, optical alignment and signal strength verification and power supply verification diagnostic information to a control system. Therefore, remote sensors according to the present invention can achieve a higher level of interface than standard input presence sensors, which generally report only the ON/OFF status of process.

Moreover, remote sensors according to the present invention are preferably characterized by the ability to modulate IEC standard on/off signals to signal a central control station according to the present invention that the remote sensors are operating properly. Therefore, remote sensors according to the present invention comply with IEC standards and can be used with conventional central control stations as well as with central control stations according to the present invention. Similarly, central control stations according to the present invention are preferably characterized by the ability to function equally well in determining process status with conventional sensors that do not emit a heartbeat modulation.

With regard to remote photosensors according to the present invention, the normal operating margin, as discussed in U.S. Pat. No. 5,281,810, the entire contents of which are hereby expressly incorporated by reference, should be above, for example, a margin setpoint of from approximately 1.5 to approximately 3 for a photoelectric sensor in the detecting state, or a margin setpoint of approximately 0.7 for a photoelectric sensor in the nondetecting state, for proper photosensor operation. Therefore, the heartbeat diagnostic output of a photosensor in the detecting state according to the present invention should deactivate when the operating margin of the photosensor drops below a set point of, for example, from approximately 1.5 to approximately 3, but remains above an operating margin set point of approximately 1. With regard to remote inductive proximity sensors according to the present invention, the normal distance between target and sensor in the "target absent" state should be less than approximately 80% of the operating point distance to ensure proper thermal stability. Therefore, the heartbeat diagnostic output of an inductive proximity sensor with a nominal 5 mm operating point should deactivate when the target approaches closer than approximately 4 mm (approximately80% of the 5 mm operating point).

This deactivation of the heartbeat diagnostic output when the operating margin drops below an operating margin that is adequate for reliable operation, interpreted by the central control station, alerts the operator that the control system may be operating in an unstable condition which may require photosensor lens cleaning or realignment of a photoelectric, inductive proximity or other type of sensor. In addition to warning of a low operating margin condition, the heartbeat diagnostic output deactivates whenever any of the control systems wires are in a short or an open circuit condition. A remote sensor according to the present invention can be used as part of a normal control system but the diagnostic output of the remote sensor will not be received.

The optimum operating distance of the photosensor from the object to be detected depends on installing the sensor in a relatively clean environment. As is well known, normal industrial environments actually range from moderately dusty to extremely dirty. When a higher operating margin is required due to a particular industrial environment, it can be obtained by adjusting the sensor, such as, for example, by increasing sensitivity or reducing the operating distance of the remote sensor.

EXAMPLE

Figures 5, 5A:
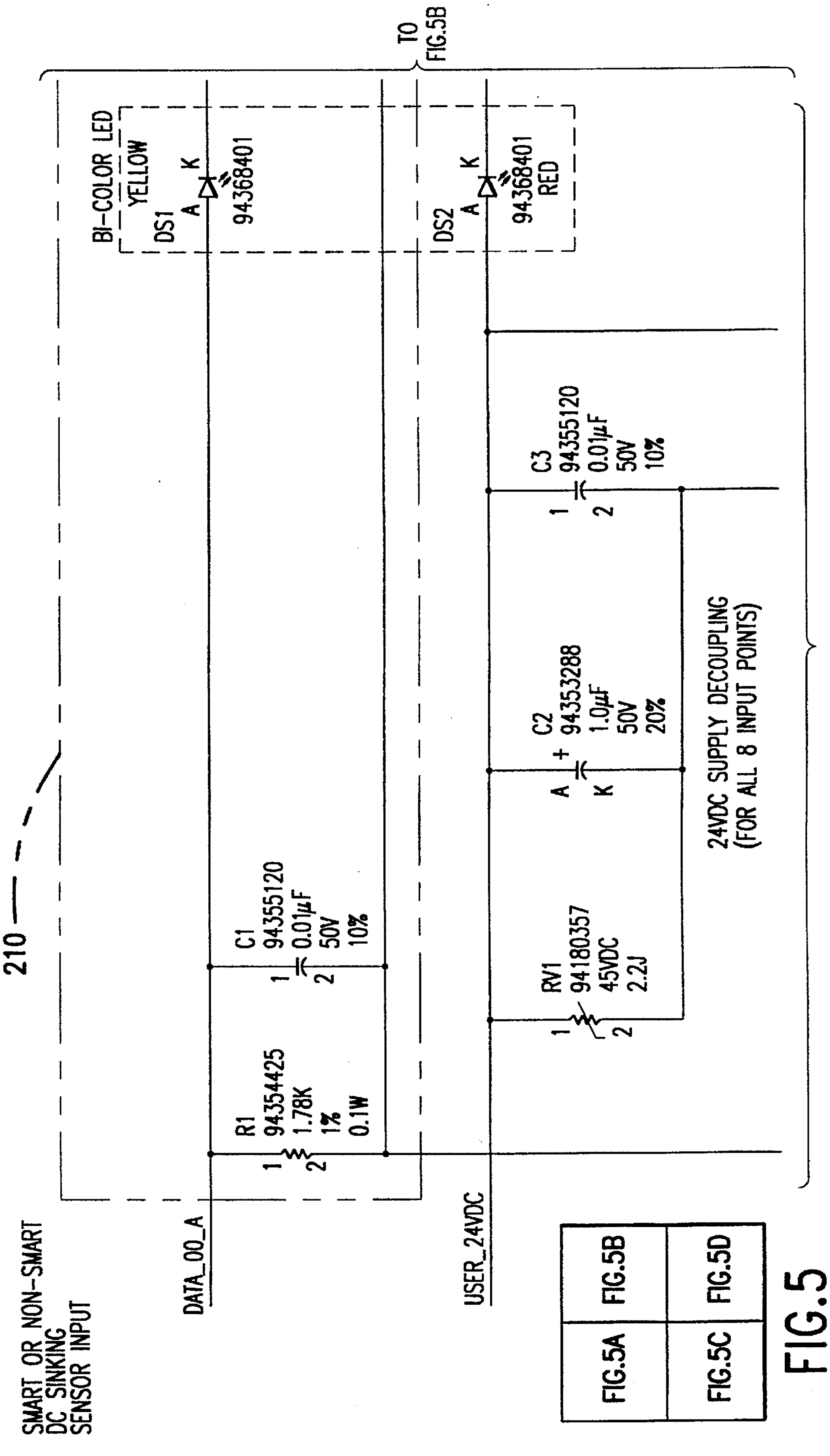
FIG. 5 illustrates a schematic view of an input circuit from a control station according to the present invention.
Figure 5B:
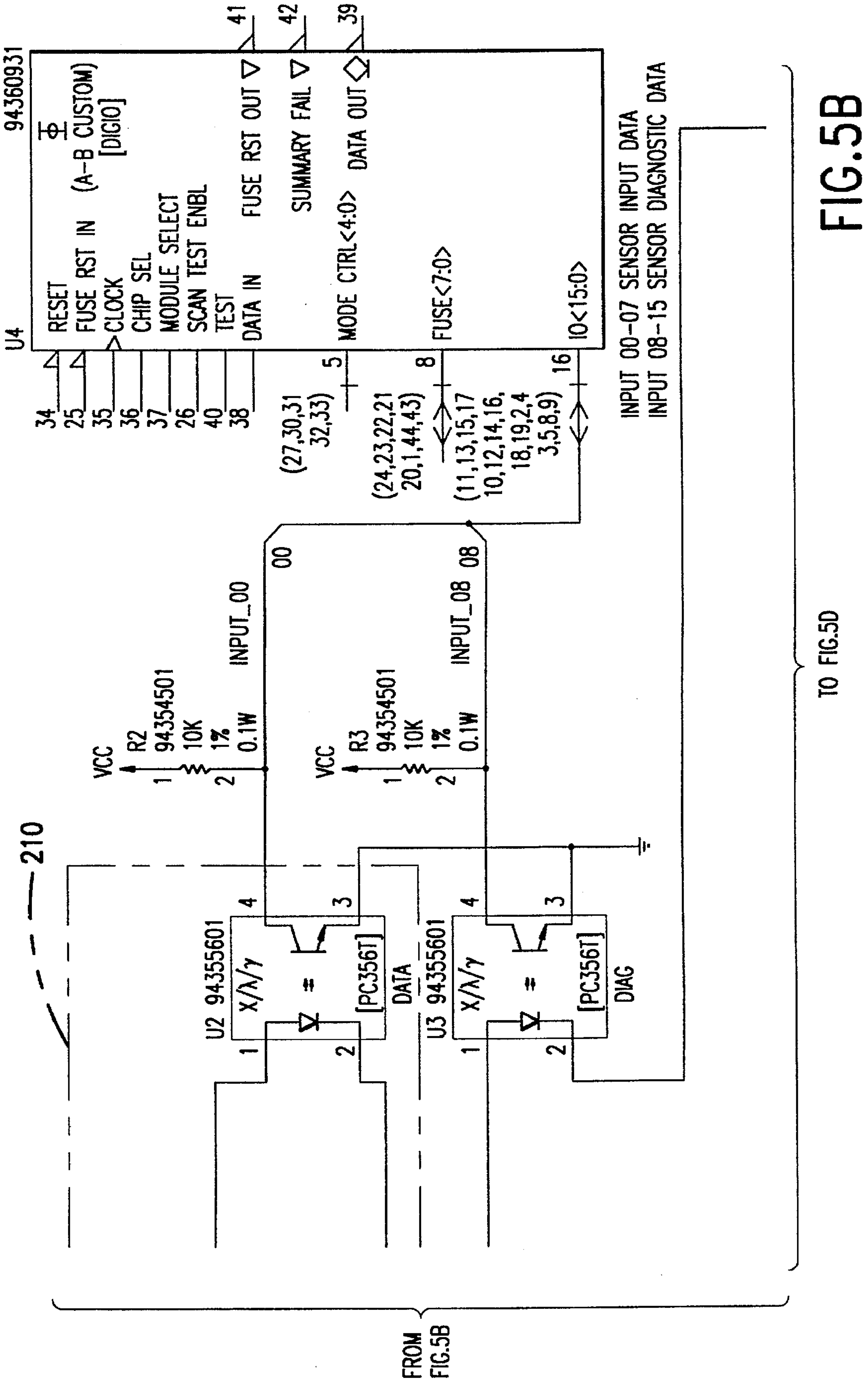
Figure 5C:
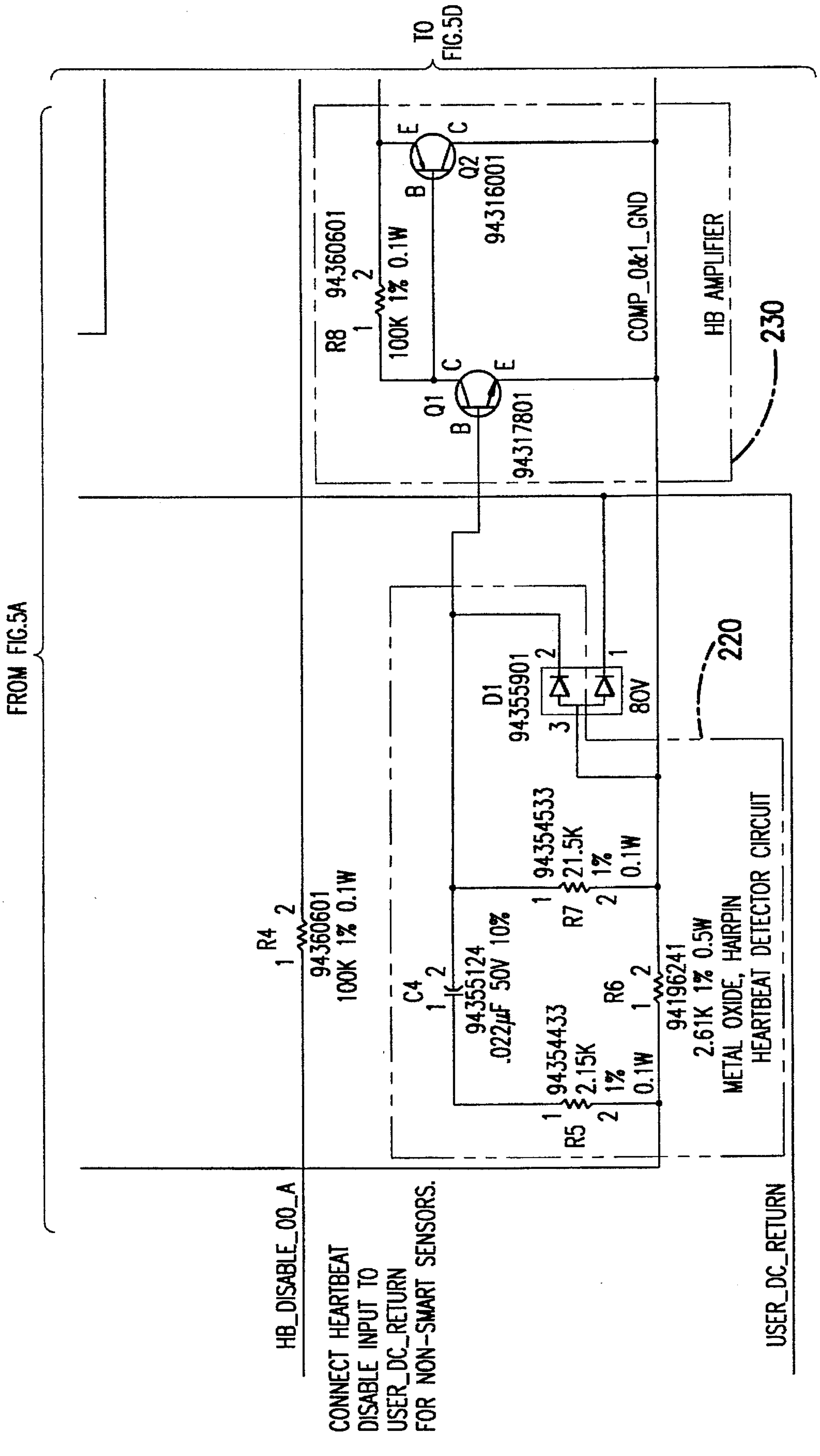
Figure 5D:
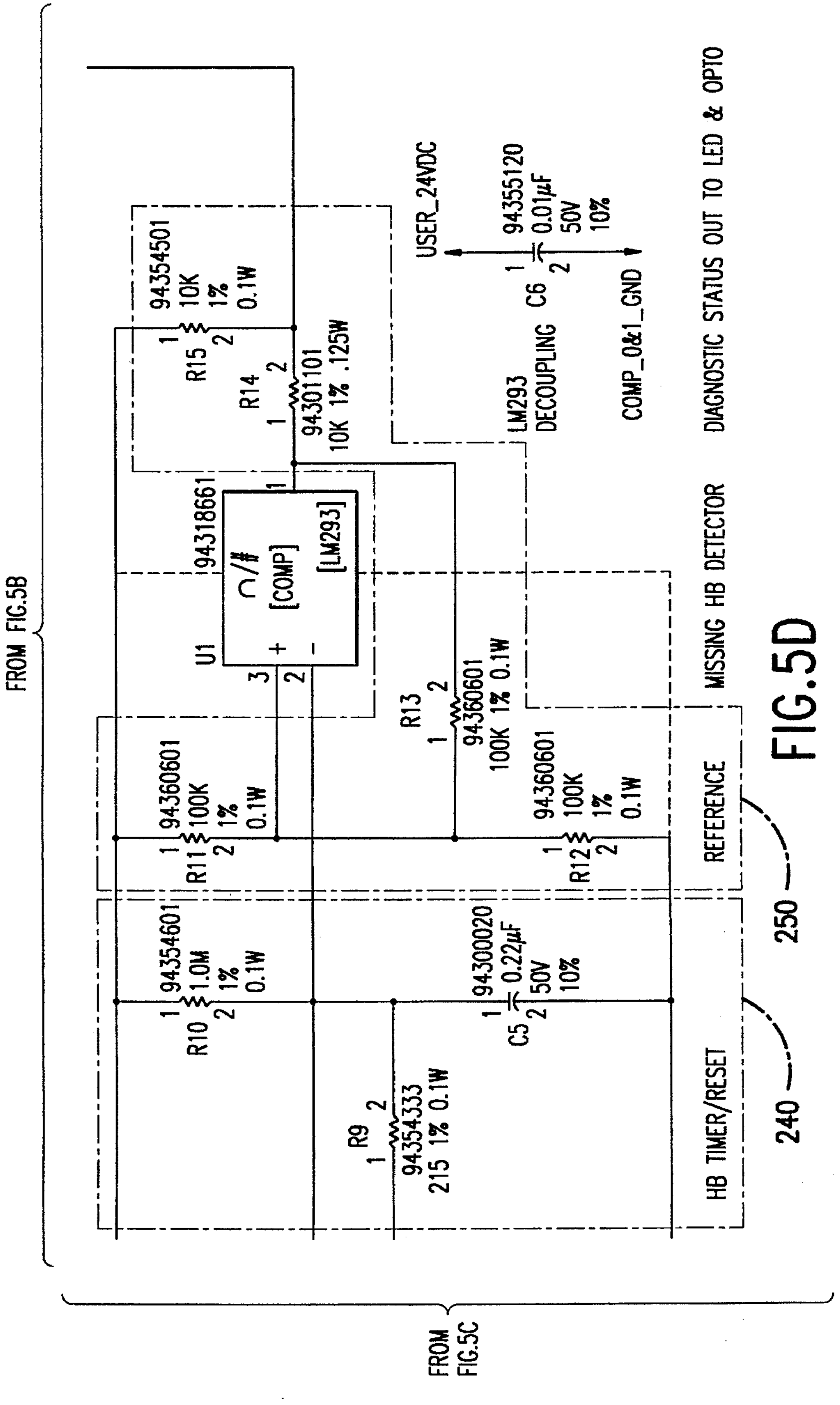

A specific embodiment of the present invention will now be further described by the following, non-limiting example of a central control station which will serve to illustrate various features of significance. The example is intended merely to facilitate an understanding of ways in which the present invention may be practiced and to further enable those of skill in the art to practice the present invention. Accordingly, the example should not be construed as limiting the scope of the present invention. Referring to the circuit schematic shown in FIG. 5, USER_24VDC and USER_DC_RETURN are the power supply connections made to the terminal base. Capacitors C2 and C3 are for 24 Vdc decoupling, and RV1 clamps the DC supply voltage to limit noise spikes. Each U1 comparator has its own decoupling capacitor C6.

DS1 is a sensor on indicator. DS2 is a heartbeat fault/diagnostic indicator. Sensor on/off circuit 210, includes R1, C1, DS1 and U2. Heartbeat detector circuit 220, includes R5–R7, C4 and $D1_2$. $D1_1$ provides reverse polarity protection. Heartbeat amplifier 230, includes Q1–Q2 and R8. Heartbeat timer/reset 240, includes R9–R10 and C5. R9 and C5 are a heartbeat reset circuit while C5 and R10 are a heartbeat timer circuit. Heartbeat timer reference 250 includes R11–R12, R13, R14 and R15.

Conventional Mode

In conventional mode configuration, the output signal from a conventional sensor is applied to the pin labeled DATA_OO_A. The yellow on-state field side indicator DS1 and the opto-isolator U2 are in series, and have a nominal 3 V drop across them when the input is on. In parallel with the light emitting diode and opto-isolator are noise shunt capacitor C1 and current shunt resistor R1. The specified value of the minimum off state current is approximately $(V_{OPTO}+V_{LED})/R1$, which is 3.1 V/1.8 KW=~1.7 mA.

The signal continues to load resistor R6, which dissipates the majority of the power generated from the sensor current. It passes through the lower diode of D1, which is installed for reverse polarity protection (field side wiring errors) of the opto-isolators and light emitting diodes, and back to the pin labeled USER_DC_RETURN. The HB_DISABLE_OO_A input is connected to the USER_DC_RETURN bus on the terminal base. This pulls one end of resistor R4 low, and an R4/R10 voltage divider places ~2.2 V at the—input of comparator U1, disabling capacitor C5 from charging any higher. At the same time, an R12/R11/R13,R14,R15 voltage divider places ~15.2 V (one end of R13 is tied to the U1 output, which is pulled up to 22.53 V) at the + input of comparator U1. Since $V_+$ is greater than $V_-$, the output of U1 is 22.53 V. The red diagnostic field side indicator and opto-isolator U3 have one side directly connected to 24 V, so both the red light emitting diode and opto-isolator U3 remain off.

The logic integrated circuit, (logic IC), U4 reads the input (ON/OFF) and diagnostic data (which is always in the "OK" state since it is disabled) from the opto-isolators, passes the data through a digital time filter, and sends the data to the control station via a serial or parallel backplane. The logic IC U4 preferably has eight user programmable filter times of from approximately 0.25 ms to approximately 32 ms, which are controlled via module control bytes which can be sent from within the central control station.

Diagnostic Mode

In diagnostic mode configuration, the modulated current input from a remote sensor according to the present invention is applied to the DATA_OO_A pin. The yellow on-state field side indicator DS1 and the opto-isolator U2 are in series, and have a nominal 3 V drop across them when the input point is on. In parallel with the light emitting diode and opto-isolator U2 are noise shunt capacitor C1 and current shunt resistor R1. The value of the minimum off state current is approximately $(V_{OPTO}+V_{LED})$/R1, which is 3.1 V/1.8 KW=~1.7 ma.

The signal continues to load resistor R6, which dissipates the majority of the power generated from the sensor current. It passes through the lower diode of D1, which is installed for reverse polarity protection (field side wiring errors) of the opto-isolators and light emitting diodes, and back to USER_DC_RETURN.

Resistors R5, R6, R7, capacitor C4 and the upper diode in D1 form heartbeat detector circuit 220. When a positive going input transition occurs, capacitor C4 is charged through the R5/R7 resistor divider across the load resistor R6. The base emitter junction of transistor Q1 is in parallel with resistor R7, so it clamps the voltage across R7 to ~0.7 V, and receives most of the C4 charging current when it turns on. The upper diode of D1 is reverse biased and out of the circuit.

When a negative going input transition occurs, capacitor C4 is discharged through the series path of resistors R5/R6/R7. The upper diode of D1 is now forward biased at ~0.7 V, and clamps both $V_{R7}$ and Q1 $V_{BE}$ to —0.7 V. The heartbeat detector circuit 220, is reset, ready for the next positive going input transition.

The small Q1 base current pulses from the heartbeat detector circuit 220, are amplified by heartbeat amplifier 230, which can consist of transistors Q1, Q2 and resistor R8. This increases the current gain of the signal so it can be fed to the heartbeat timer circuit.

Since a remote sensor according to the present invention is being used, the HB_DISABLE_OO_A input is left unconnected. This takes resistor R4 out of the circuit, and enables the heartbeat timer reset circuit 240.

A heartbeat timer circuit is formed with resistor R10 and capacitor C5. As long as a heartbeat signal is detected, transistor Q2 turns on and pulls capacitor C5 low through resistor R9. $V_{C5}$ is a sawtooth waveform, being reset when a positive going heartbeat input current step occurs.

A heartbeat reference voltage is derived from resistors R11, R12, R13, R14 and R15 and is sent to the + pin of comparator U1. When the missing heartbeat detector (comparator) output is high, R13 is in parallel with R11, and the $V_{Reference}$ is ~15.2 V. When the missing heartbeat detector output is low, R13 is in parallel with R12 and the $V_{Reference}$ is ~8 V. This adds some hysteresis to the circuit; to detect a missing heartbeat (FAIL state), C5 must go higher than 15.2 V, and to reset after a missing heartbeat (OK state), C5 must go lower than 8 V.

When a heartbeat signal is detected, the missing heartbeat detector output will be 24 V. The red diagnostic field side indicator DS2 and opto-isolator U3 have one side directly connected to 22.53 V, so both the red light emitting diode and opto-isolator U3 remain off. Resistor R15 is a pull up to ensure the light emitting diode and opto-isolator stay off by maintaining no more than 0.735 V across them.

When a heartbeat signal is not detected, the missing heartbeat detector output will be 0 V. The red diagnostic field side indicator DS2 and opto-isolator U3 will turn on. Resistor R14 is a current limiter for the red light emitting diode and opto-isolator.

The logic IC U4 reads the input (ON/OFF) and diagnostic data (FAIL/OK) from the opto-isolators, passes the data through a digital time filter, and preferably sends the data within the central control station via a serial or parallel backplane. As noted above, the logic IC U4 can have eight user programmable filter times of from approximately 0.25 ms to approximately 32 ms, which can be controlled via module control bytes which can be sent from within the central control station.

Central control station diagnostic capability can consist of individual reporting of a diagnostic fault for each remote sensor connected to it. The central control station can be configured to detect the heartbeat signal from each remote sensor, as well as indicate and report a diagnostic error if the heartbeat is missing.

The central control station should also be able to be configured to distinguish between a remote sensor according to the present invention and a conventional remote sensor. The central control station should be able to automatically disable any diagnostic indicators on the central control station and disable diagnostic reporting to a programmable logic controller when the central control station is used with standard (conventional) sensors.

The central control station should be compatible with the following conventional industry standard sensors: limit switches; push buttons; two wire standard proximity switches; three wire standard output photoelectric switches, two wire photoelectric switches; and three wire standard output proximity switches. Conventional industry standard sensors report input status only, and not diagnostic status.

The central control station can supply 24 V dc power to the remote sensors connected to it. This can be done via an external supply to the modular block base and a terminal block connector.

The central control station should give no false light emitting diode indication or data reporting to the adapter during power up if the modular block adapter/supply is operating from the same 24 Vdc power supply as the terminal block base and remote sensors. The 5 Vdc logic supply to the central control station should power up after the heartbeat detect circuit has started.

If the modular block adapter/supply is operating from a separate 24 Vdc power supply when power is initially applied to the terminal block base and remote sensors, the central control station can indicate a sensor power error by strobing the red diagnostic light emitting diode, and by strobing a diagnostic error to the adapter. This strobe (<200 msec) occurs because the heartbeat detect circuit derives its power from the terminal block base power supply and the voltage turn on is interpreted to be a faulty heartbeat by the logic side circuitry.

A delay time OFF/ON is defined as time from a valid input signal to recognition by the central control station. Delay time ON/OFF is defined as time from the input signal dropping below the valid level to recognition by the central control station. Delay time does not include communication delays.

The remote sensor according to the present invention can be detected using a current transition sensing/differentiator method. This method uses a less complicated circuit, allows some dual component packages to be used, uses mainly low cost passive components, and has a wide tolerance for component and environmental variations.

A data monitor screen that is part of a control system according to the present invention can: 1) display individual sensor input status (On/Off); and 2) display individual sensor diagnostic fault status (On/Off). A configuration monitor screen can display and select input filter times for the central control station.

Although the best mode contemplated by the inventors of carrying out the present invention is disclosed above, many additions and changes to the present invention could be made without departing from the spirit and scope of the underlying inventive concept. For example, numerous changes in the details of the parts, the arrangement of the parts and the construction of the combinations will be readily apparent to one of ordinary skill in the art without departing from the spirit and scope of the underlying inventive concept.

Moreover, while there are shown and described herein certain specific combinations embodying the present invention for the purpose of clarity of understanding, the specific combinations are to be considered as illustrative in character, it being understood that only preferred embodiments have been shown and described. It will be manifest to those of ordinary skill in the art that certain changes, various modifications and rearrangements of the features may be made without departing from the spirit and scope of the underlying inventive concept and that the present invention is not limited to the particular forms herein shown and described.

It is intended that the appended claims cover all such changes, modifications and rearrangements. Expedient embodiments of the present invention are differentiated by the appended subclaims.

What is claimed is:

1. A dual channel communications method comprising:

(A) providing a control system with a central control station and a remote sensor for sensing a process status, said central control station and said remote sensor being connected by a power supply line and an output line;

(B) impressing a non-periodic high-amplitude process status signal on said output line at said remote sensor so as to transfer status information about said process status to said central control station;

(C) simultaneously impressing a periodic low-amplitude low-frequency diagnostic condition signal on said output line at said remote sensor so as to transfer diagnostic information about an operating condition of said remote sensor to said central control station;

(D) monitoring the electrical state of said output line at said central control station to detect the level of said non-periodic high-amplitude process status signal so as to receive status information about said process status at said central control station; and (E) monitoring the electrical state of said output line at said central control station to detect the presence of said periodic low-amplitude low-frequency diagnostic condition signal so as to receive diagnostic information about i) said operating condition of said remote sensor, ii) said power supply line and iii) said output line at said central control station.

2. The dual channel communications method of claim 1, wherein said non-periodic high-amplitude process status signal is selected from the group consisting of a square wave signal, a saw tooth wave signal and a sinusoidal wave signal.

3. The dual channel communications method of claim 1, wherein said remote sensor is selected from the group consisting of a photoelectric remote sensor, an inductive proximity remote sensor, a capacitive remote sensor, a magnetic remote sensor and an ultrasonic remote sensor.

4. The dual channel communications method of claim 1, wherein said operating condition of said remote sensor is an operating margin and the step of simultaneously impressing a periodic low-amplitude low-frequency diagnostic condition signal on said output line at said remote sensor is reversibly disabled when said operating margin is inadequate for reliable operation of said remote sensor.

5. A dual channel communications capable control system comprising:

(A) a remote sensor for sensing a process status and an operating condition of said remote sensor, said remote sensor including i) a switch for switching an output signal from said remote sensor between a first status band and a second status band as a function of said process status in response to information about said process status sensed by said remote sensor so as to transmit status information about said process status and ii) a modulator for (a) continuously toggling said output signal within a first diagnostic range, when said output signal is within said first status band, as a function of said operating condition of said remote sensor in response to diagnostic information about said operating condition of said remote sensor so as to transmit diagnostic information about said operating condition of said remote sensor, and (b) continuously toggling said output signal within a second diagnostic range, when said output signal is within said second status band, as a function of said operating condition of said remote sensor in response to diagnostic information about said operating condition of said remote sensor so as to transmit diagnostic information about said operating condition of said remote sensor;

(B) an output line including a first end and a second end, said first end of said output line being electrically connected to said remote sensor so as to conduct said output signal; and (C) a central control station for centrally monitoring status information about said process status and diagnostic information about said operating condition of said remote sensor through said output line based on an electrical state of said output signal, said central control station being electrically connected to said second end of said output line, said central control station including i) a detector for detecting switching of said output signal between said first status band and said second status band so as to respond to changes in said output signal characterized by status information about said process status received from said remote sensor through said output line and ii) a detector for detecting continuous toggling of said output signal within said first diagnostic range and said second diagnostic range so as to respond to changes in said output signal characterized by diagnostic information about said operating condition of said remote sensor received through said output line, wherein 1) status information about said process status and diagnostic information about said operating condition of said remote sensor can be simultaneously carried by said output signal over said output line and 2) said operating condition of said remote sensor is an operating margin and said modulator for continuously toggling is reversibly disabled when said operating margin is inadequate for reliable operation of said remote sensor.

6. The dual channel communications capable control system of claim 5, wherein said detector for detecting continuous toggling includes:

(A) a filter for filtering out DC signal components from said output signal so as to produce a filtered output signal;

(B) a transistor that is triggered on when said filtered output signal exceeds a threshold value;

(C) a capacitor that is continuously charged by a power supply and subject to being discharged when said transistor is triggered on; and (D) a comparator that is responsive to the level of voltage across said capacitor so as to indicate the presence of continuous toggling of said output signal within said first diagnostic range and said second diagnostic range.

7. The dual channel communications capable control system of claim 5, wherein said modulator for continuously toggling includes:

(1) an oscillator;

(2) at least one diode coupled to said output line;

(3) a transistor that is configured to be periodically driven on and off by said oscillator and is connected for shunting said output line around said at least one diode as a means of providing heartbeat modulation when the output is within the first status band; and (4) a second transistor that is configured to be periodically driven on and off by said oscillator and is connected for shunting said output line with a resistive leakage current path around said at least one diode as a means of heartbeat modulation when the output is within the second status band.

8. A remote sensor for sensing a process status comprising:

(A) a switch for switching an output signal from said remote sensor between a first status band and a second status band as a function of said process status in response to status information about said process status sensed by said remote sensor so as to transmit status information about said process status; and (B) a modulator for continuously toggling said output signal within a diagnostic range as a function of an operating condition of said remote sensor in response to diagnostic information about said operating condition of said remote sensor so as to transmit diagnostic information about said operating condition of said remote sensor, wherein 1) said remote sensor can be used with a central control station that responds to changes in said output signal characterized by switching said output signal between said first status band and said second status band by receiving status information about said process status from said remote sensor and does not respond to changes in said output signal characterized by toggling said output signal within said diagnostic range and 2) said operating condition of said remote sensor is an operating margin and said modulator for continuously toggling is reversibly disabled when said operating margin is inadequate for reliable operation.

9. The remote sensor for sensing a process status of claim 8, wherein said modulator for continuously toggling includes:

(1) an oscillator;

(2) at least one diode coupled to said output line; and (3) a transistor that is configured to be periodically driven on and off by said oscillator and is connected for shunting said output line around said at least one diode as a means of providing heartbeat modulation when the output is within the first status band; and (4) a second transistor that is configured to be periodically driven on and off by said oscillator and is connected for shunting said output line with a resistive leakage current path around said at least one diode as a means of heartbeat modulation when the output is within the second status band.

10. A central control station for centrally monitoring information about a process status and an operating condition of a remote sensor through an output line based on an electrical state of an output signal, said central control station comprising:

(A) a detector for detecting switching of said output signal between a first status band and a second status band so as to respond to changes in said output signal by receiving status information about said process status from said remote sensor through said output line; and (B) a detector for detecting continuous toggling of said output signal within a first diagnostic range and a second diagnostic range so as to respond to changes in said output signal characterized by diagnostic information about said operating condition of said remote sensor received from remote sensor through said output line, wherein 1) status information about said process status and diagnostic information about said operating condition of said remote sensor can be simultaneously carried by said output signal over said output line and 2) said detector for detecting continuous toggling includes:

(a) a filter for filtering out DC signal components from said output signal so as to produce a filtered output signal;

(b) a transistor that is triggered on when said filtered output signal exceeds a threshold value;

(c) a capacitor that is continuously charged by a power supply and subject to being discharged when said transistor is triggered on; and (d) a comparator that is responsive to the level of voltage across said capacitor so as to indicate the presence of continuous toggling of said output signal within said first diagnostic range and said second diagnostic range.

* * * * *